(12) United States Patent  
Vasudeva et al.

(10) Patent No.: US 8,662,853 B2  
(45) Date of Patent: Mar. 4, 2014

(54) WIND TURBINE BLADE AND METHOD OF CONSTRUCTING SAME

(75) Inventors: Kailash Vasudeva, Waterloo (CA); Sanjeev Bedi, Waterloo (CA)

(73) Assignee: Maxiflow Manufacturing Inc., Halifax, Nova Scotia (CA)

( * ) Notice: Subject to any disclaimer, the term of this patent is extended or adjusted under 35 U.S.C. 154(b) by 919 days.

(21) Appl. No.: 12/759,357

(22) Filed: Apr. 13, 2010

(65) Prior Publication Data

US 2010/0260612 A1    Oct. 14, 2010

Related U.S. Application Data

(60) Provisional application No. 61/168,672, filed on Apr. 13, 2009, provisional application No. 61/171,139, filed on Apr. 21, 2009.

(51) Int. Cl.  
*F03D 11/00*    (2006.01)

(52) U.S. Cl.  
USPC ........ 416/226; 416/132 B; 416/230; 416/233; 416/241 A; 29/889.71; 29/889.72

(58) Field of Classification Search  
USPC .................. 416/229 R, 229 A, 230, 224, 226, 416/232–233, 241 A, 132 R, 132 B, 212 R, 416/212 A; 29/889.7, 889.71, 889.72; 244/123.1, 123.14, 123.2, 123.7, 244/123.8, 123.9, 124  
See application file for complete search history.

(56) References Cited

U.S. PATENT DOCUMENTS

| | | | |
|---|---|---|---|
| 3,273,833 A | * | 9/1966 | Windecker .................. 244/123.5 |
| 3,416,756 A | * | 12/1968 | Windecker .................... 416/230 |
| 4,329,116 A | | 5/1982 | Ljungstrom |
| 4,739,954 A | * | 4/1988 | Hamilton ..................... 416/226 |
| 7,901,188 B2 | | 3/2011 | Llorente Gonzalez et al. |
| 8,425,195 B2 | | 4/2013 | Rudling |
| 8,511,996 B2 | | 8/2013 | Llorente Gonzalez et al. |
| 2007/0105431 A1 | | 5/2007 | Cairo |
| 2007/0217918 A1 | | 9/2007 | Baker et al. |
| 2009/0136355 A1 | | 5/2009 | Finnigan et al. |
| 2010/0143143 A1 | | 6/2010 | Judge |
| 2010/0143148 A1 | | 6/2010 | Chen et al. |
| 2011/0103962 A1 | | 5/2011 | Hayden et al. |

FOREIGN PATENT DOCUMENTS

| | | | |
|---|---|---|---|
| DE | 10 2008 037 367 | 3/2009 | |
| EP | 1 584 817 | 10/2005 | |
| FR | 2459381 | 1/1981 | |
| FR | 2 874 852 | 3/2006 | |
| GB | 2416195 A * | 1/2006 | ............... F03D 1/06 |
| GB | 2445929 | 7/2008 | |
| JP | 2004-011616 | 1/2004 | |
| WO | WO 01/48378 | 7/2001 | |
| WO | WO 2010026903 | 3/2010 | |

OTHER PUBLICATIONS

International search report for PCT/CA2010/000558, Aug. 24, 2010.*

* cited by examiner

*Primary Examiner* — Christopher Verdier

(57) ABSTRACT

A wind turbine blade including a number of segments attached together end-to-end in a predetermined arrangement so that the respective covering subassemblies of the segments cooperate to form a substantially smooth surface of the wind turbine blade. Each segment includes a number of fiber tubes extending along preselected lengths of the segment respectively, the fiber tubes being laterally spaced apart from each other respectively to define gaps therebetween. The segment also includes a covering subassembly at least partially supported by the fiber tubes and at least partially defining an internal cavity.

7 Claims, 9 Drawing Sheets

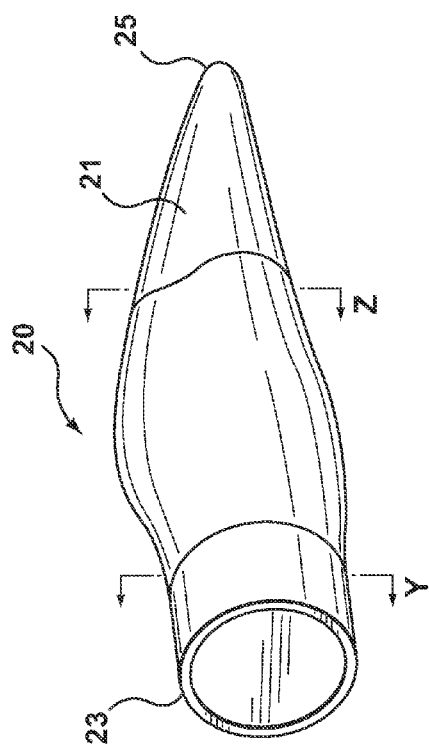
FIG. 1
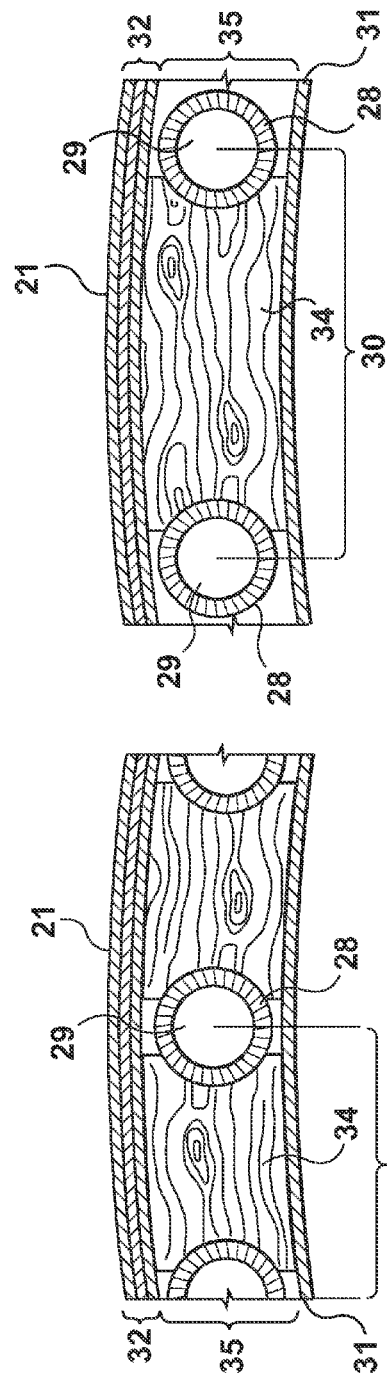
FIG. 2
FIG. 3

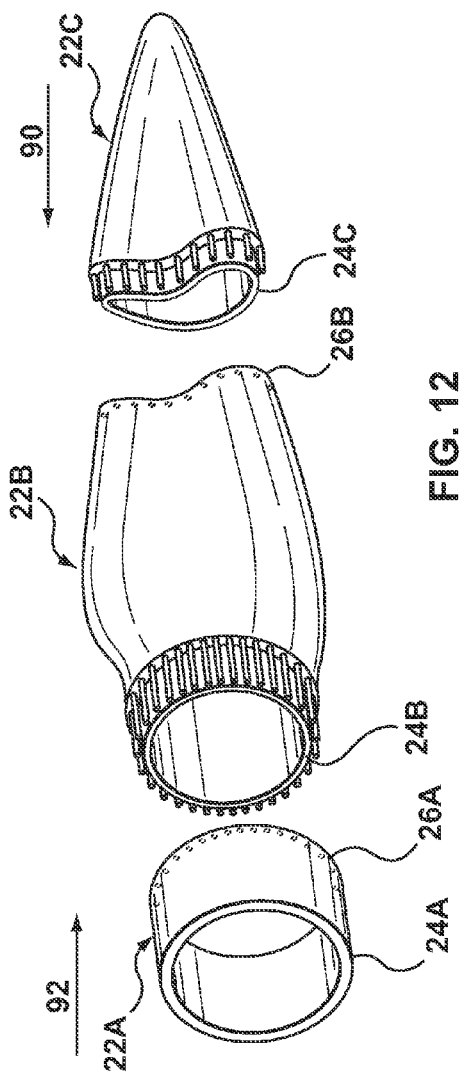
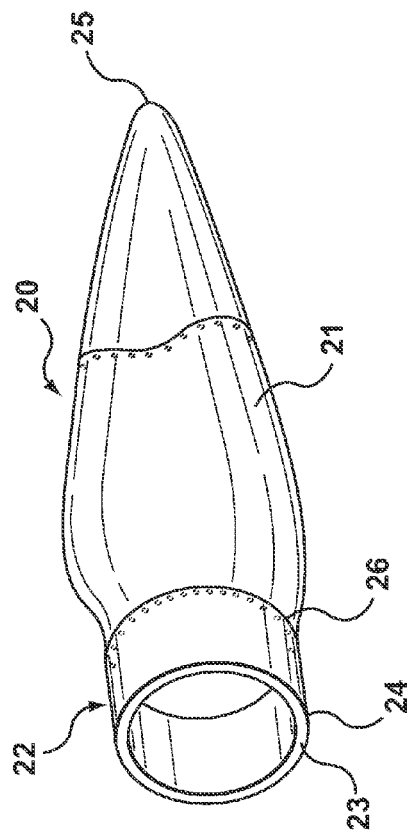
FIG. 12
FIG. 13

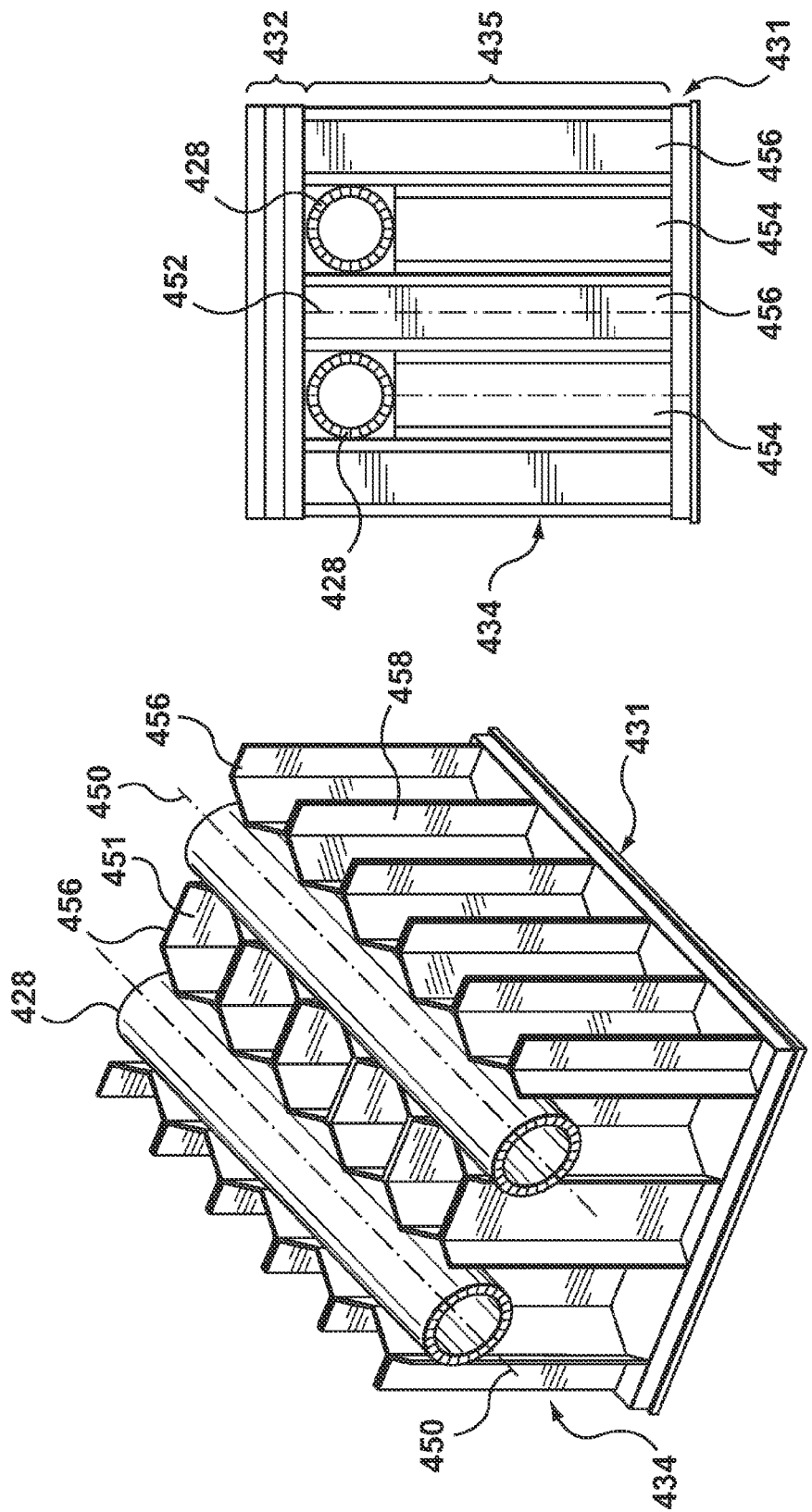

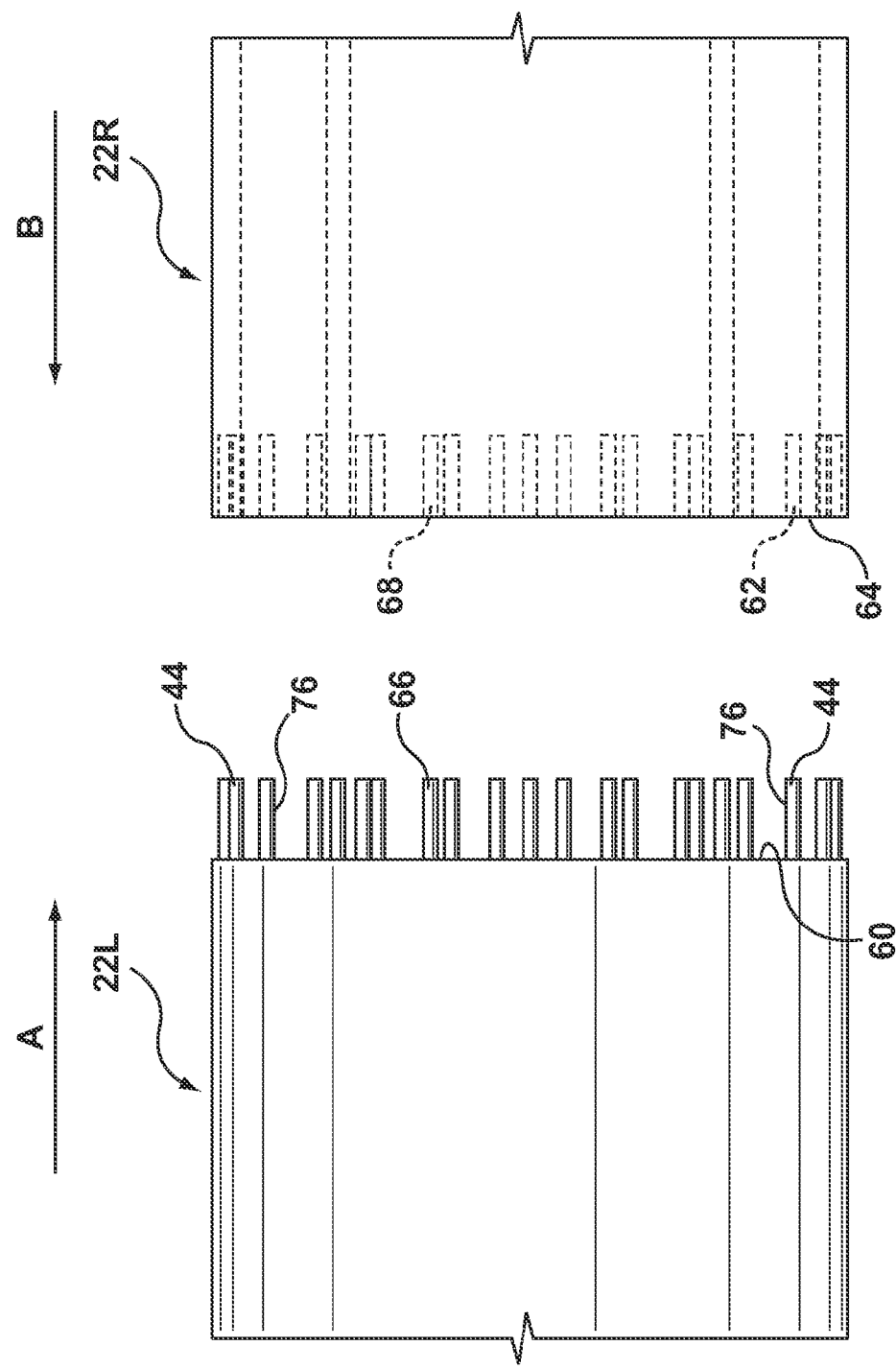

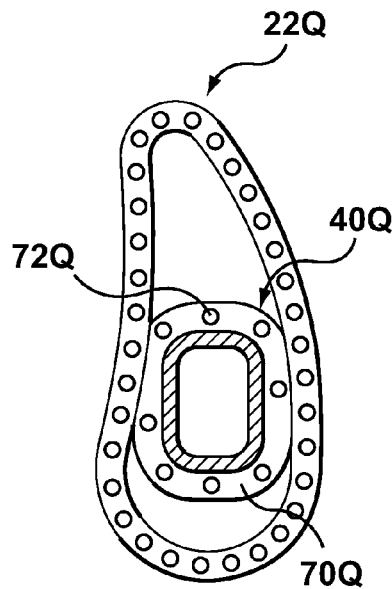
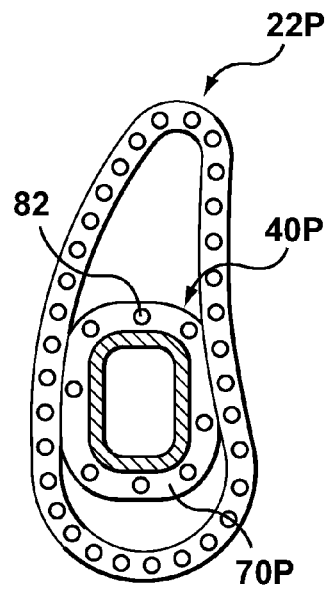
FIG. 18A    FIG. 18B
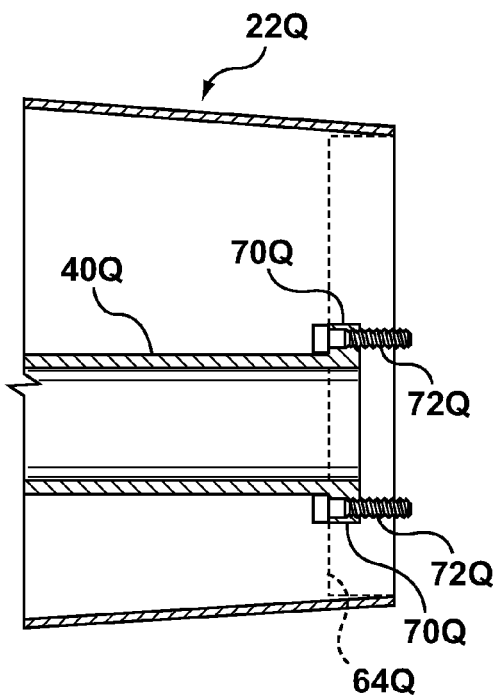
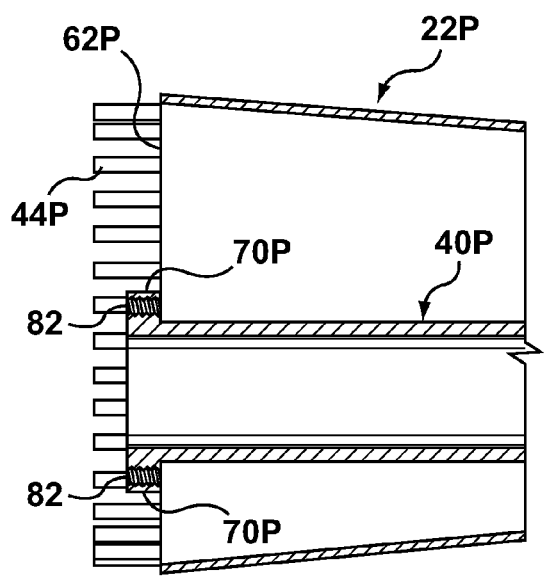
FIG. 18C

WIND TURBINE BLADE AND METHOD OF CONSTRUCTING SAME

This application claims the benefit of U.S. Provisional Patent Application No. 61/168,672, filed Apr. 13, 2009, and U.S. Provisional Patent Application No. 61/171,139, filed Apr. 21, 2009, and incorporates each such provisional application herein in its entirety by reference.

FIELD OF THE INVENTION

The present invention is a wind turbine blade including segments attached together end-to-end in a predetermined arrangement.

BACKGROUND OF THE INVENTION

In horizontal axis wind turbines, the blades are typically relatively long, e.g., 20-40 meters in length. Generally, most horizontal axis wind turbines include either two or three blades. In general, the weight of the blades is a constraining factor in wind turbine design, and different materials and methods of construction are known which are intended to provide blades which are sufficiently strong to withstand the stresses to which they are subjected, but have minimal weight.

In the prior art, various fibreglass composite fabrication techniques typically are used to make the known wind turbine blades. These techniques typically involve manual labor, i.e., they are relatively costly, and there may be some quality control issues. Typically, the entire blade is formed in one piece.

Another disadvantage of the known wind turbine blades is the cost of constructing a wind turbine using such blades. Typically, each prior art blade is formed as an integral unit respectively, and each blade must be transported to the site at which the turbine is to be assembled. In some cases, however, it is not possible to construct a wind turbine in an advantageous location because of the difficulties involved in transporting the fully-formed blades to the site. In addition, due to the large size of each blade, the assembly of known wind turbines tends to be relatively expensive.

Also, if a prior art single-piece blade is damaged (e.g., during assembly or operation), then the entire blade usually must be replaced. This involves significant costs.

SUMMARY OF THE INVENTION

For the foregoing reasons, there is a need for an improved wind turbine blade which addresses or mitigates one or more of the disadvantages of the prior art.

In its broad aspect, the invention provides a segment of a wind turbine blade including a number of fiber tubes extending along preselected lengths of the segment respectively, the fiber tubes being laterally spaced apart from each other respectively to define gaps therebetween. Each segment also includes a covering subassembly at least partially supported by the fiber tubes and at least partially defining an internal cavity.

In another aspect, the invention provides a wind turbine blade including a number of the segments attached together end-to-end in a predetermined arrangement so that the respective covering subassemblies of the segments cooperate to form a substantially smooth surface of the wind turbine blade.

In another aspect, each segment additionally includes at least one or more internal frames positioned in the internal cavity, for at least partially supporting the covering subassembly.

In another aspect, each internal frame includes a plurality of frame fiber tubes therein, the frame fiber tubes substantially extending between inner and outer ends of each segment respectively.

In another of its aspects, selected ones of the segments cooperate with selected cooperating ones of the segments respectively to attach the selected ones and the selected cooperating ones of the segments together end-to-end in the predetermined arrangement.

In yet another aspect, each selected one additionally includes a number of mating elements mounted therein, each mating element extending beyond a first preselected end of each selected one. Each selected cooperating one includes a number of apertures in a second preselected end thereof in which the mating elements are receivable respectively when the first preselected end of each selected one and the second preselected end of each selected cooperating one of the segments are engaged, for attaching the selected one and the cooperating one of the segments together in the predetermined arrangement.

In another of its aspects, each selected one additionally includes a number of frame mating elements mounted in the internal frame of each selected one respectively. Each frame mating element extends beyond the first preselected end of each selected one. Each cooperating one of the segments includes a number of frame apertures in the internal frame thereof in which the frame mating elements are receivable when the first preselected end of the selected one and the second preselected end of the cooperating one of the segments are engaged, for attaching the selected one and the cooperating one of the segments together in the predetermined arrangement.

In another aspect, each internal frame in each selected one of the segments includes a flange adapted for receiving a fastener therein. Each internal frame in each cooperating one of the segments includes a cooperating flange adapted for receiving the fastener therein. When the first preselected end of the selected one and the second preselected end of the cooperating one of the segments are engaged, the flange and the cooperating flange are securable together by the fastener, for attaching the selected one and the cooperating one of the segments together in the predetermined arrangement.

In another aspect, each gap is substantially filled by a filler element at least partially adapted to strengthen a support subassembly including the fiber tubes and the filler element, for at least partially supporting the covering subassembly.

In another of its aspects, the invention includes a method of making a segment of a wind turbine blade including, first, providing one or more internal frames. Next, fiber tubes are positioned spaced apart from each other in a predetermined pattern so that the fiber tubes are at least partially supported by the internal frame, to form a support subassembly. Finally, one or more covering subassemblies is positioned on the support subassembly.

In another aspect, the invention includes a method of making a wind turbine blade including, first, providing a number of segments of the turbine blade, each segment being adapted to cooperate with other segments to fit together end-to-end in a predetermined arrangement so that the respective covering subassemblies of the segments cooperate to form a substantially smooth surface of the wind turbine blade. Next, the segments are attached to each other in the predetermined arrangement.

BRIEF DESCRIPTION OF THE DRAWINGS

The invention will be better understood with reference to the attached drawings, in which:

FIG. 1 is an isometric view of a portion of an embodiment of a turbine blade of the invention;

FIG. 2 is a portion of a cross-section (taken at section Y in FIG. 1) of a portion of the turbine blade of FIG. 1, drawn at a larger scale;

FIG. 3 is a portion of a cross-section (taken at section Z in FIG. 1) of a portion of the turbine blade of FIG. 1;

FIG. 12 is an isometric view of three segments of an embodiment of the turbine blade of the invention, positioned for attachment thereof to each other;

FIG. 13 is an isometric view of an embodiment of the turbine blade of the invention;

FIG. 14 is an isometric view of a portion of an alternate embodiment of a turbine blade assembly of the invention, drawn at a larger scale;

FIG. 15 is a side view of the portion of FIG. 14 with a covering subassembly positioned thereon;

FIG. 16A is a side view of embodiments of two cooperating segments of the turbine blade of the invention with mating elements aligned to be received in apertures, drawn at a smaller scale;

FIG. 18A is an end view of another embodiment of the segment of the invention, drawn at a smaller scale;

FIG. 18B is an end view of a segment adapted for mating with the segment of FIG. 18A; and FIG. 18C is a cross-section of the segments of FIGS. 18A and 18B, positioned for engagement with each other.

DETAILED DESCRIPTION

Figure 4:
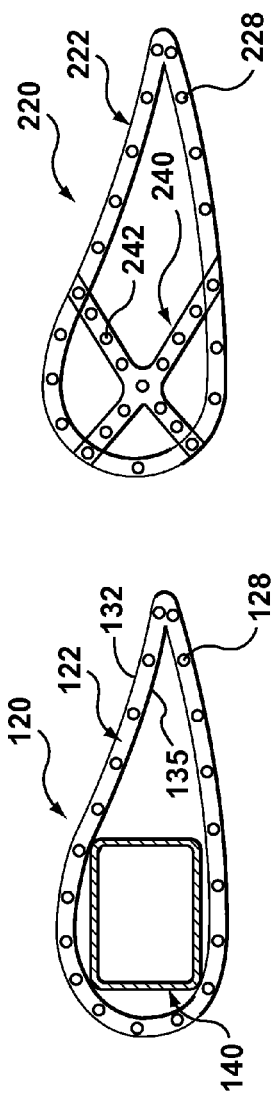
FIG. 4 is a cross-section of another embodiment of the turbine blade assembly of the invention, drawn at a smaller scale.
Figure 5:
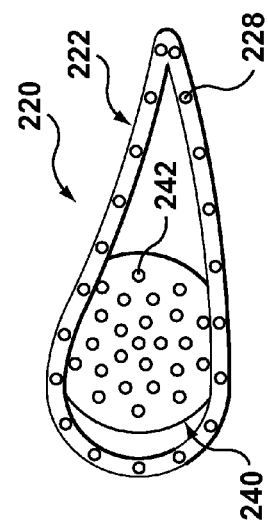
FIG. 5 is a cross-section of the another embodiment of the turbine blade assembly of the invention.

In the attached drawings, like reference numerals designate corresponding elements throughout. Reference is first made to FIGS. 1-3, 9-12, 13, and 16A-18C to describe an embodiment of a wind turbine blade in accordance with the invention indicated generally by the numeral 20. As can be seen in FIG. 13, the blade 20 preferably includes one or more segments 22 extending between inner and outer ends 24, 26 thereof. Each segment preferably includes a plurality of fiber tubes 28 extending along preselected lengths of the segment 22 respectively, as will be described. The fiber tubes 28 preferably are laterally spaced apart from each other respectively to define gaps 30 therebetween (FIGS. 2, 3). As will also be described, the segment 22 preferably also includes a covering subassembly 32 which is at least partially supported by the fiber tubes 28.

It will be understood that, for the purposes of illustration, the sizes of the fiber tubes are exaggerated in certain of the drawings. The fiber tubes 28 are formed in any suitable manner, using any suitable material or materials. For instance, in one embodiment, the fiber tubes are formed by wrapping carbon fiber cloth around a substantially cylindrical core element, which is removed, once the carbon fiber cloth is treated (in any suitable manner) so it will hold its shape. The carbon fiber cloth includes carbon fibers, as is known. Each fiber tube 28 defines a bore 29 therein. It will be understood that the carbon fibers are relatively small in diameter, e.g., between approximately 0.005 mm. and approximately 0.010 mm.

It will also be understood that the fiber tubes 28 may include any material adapted to withstand relatively substantial tension. The fiber tubes 28 may include, for example, Kevlar fibers or fiberglass or any other materials having generally similar strength and other characteristics. Preferably, each fiber tube 28 extends substantially along the entire length of the segment 22 in which they are positioned, to provide a relatively strong segment. To form the wind turbine blade 20, the segments 22 preferably are attached together end-to-end in a predetermined arrangement so that the respective covering subassemblies 32 of the segments 22 cooperate to form a substantially smooth surface 21 of the wind turbine blade 20, as will also be described. The segments 22 are assembled in the predetermined arrangement to form the blade 20, which extends between a mounting end 23 (attachable to the rotor of the wind turbine) and an outer tip 25 (FIG. 1)

The fiber tubes 28 are included in a support subassembly 35. The distance 30 between the fiber tubes or rods 28 preferably varies along the length of the blade 20 (FIGS. 2, 3). As can be seen in FIGS. 2 and 3, in one embodiment, each gap 30 is substantially filled by a filler element 34 which engages the fiber tubes 28, for strengthening the covering subassembly 32. The filler elements 34 may be any suitable material or materials. The filler element 34 preferably is made of relatively less dense material. For example, the filler element 34 may be a lightweight wood, for strengthening the segment and providing flexibility. However, other materials (e.g., a suitable composite or a suitable metal, formed into a honeycomb array for strength, as will be described) may be used as the filler element. Preferably, the filler element is at least partially adapted for strengthening the support subassembly 35.

Alternatively, the gaps 30 may be open, i.e., not filled by any filler elements. In one embodiment, the fiber tubes 28 preferably are positioned on an underlying layer 31. The fiber tubes 28 and the underlying layer 31 collectively, or the fiber tubes 28, the underlying layer, and the filler elements 34, as the case may be, are collectively referred to as the support subassembly 35, which at least partially supports the covering subassembly 32.

Figure 11:
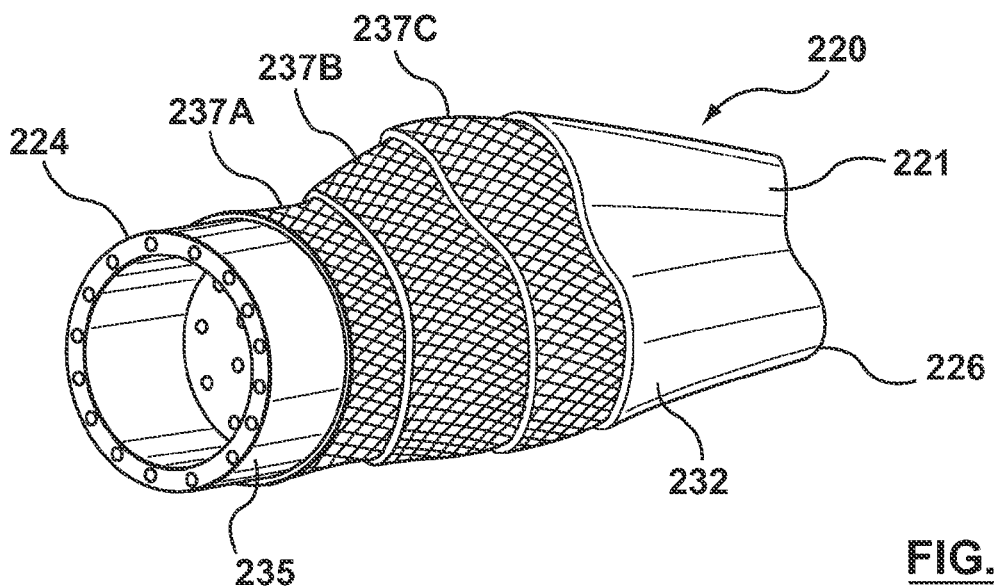
FIG. 11 is an isometric view of the support subassembly and internal frame of FIG. 10 with a covering subassembly partially positioned thereon.

The covering subassembly 32 preferably is any suitable covering material or materials which can be formed according to the blade's overall design with acceptable exterior surface finishing. As is known in the art, the surface of the blade (once assembled) is required to be relatively smooth. The covering subassembly 32 is at least partially supported by the support subassembly 35. In one embodiment, for example, the covering subassembly includes layers of carbon fiber cloth used with epoxy, i.e., held together with epoxy resin. The advantage of the carbon fiber cloth is that it can provide a precise edge, which results in less noise during operation of the wind turbine. For example, a number of layers of carbon fiber cloth are shown in FIG. 11.

In one embodiment, the support subassembly 35 and the covering subassembly 32 preferably are securely attached together. For example, as shown in FIGS. 2 and 3, where the support subassembly 35 includes the filler material, then the filler material and the fiber tubes 28 are securely attached to the covering subassembly 32. Because those skilled in the art would be aware of the various ways to secure the covering subassembly 32 to the support subassembly 35, it is not necessary to describe such attachment in further detail.

It will be understood that, during construction of the segment 22, the support subassembly 35 preferably is supported by an appropriate form (not shown). In this embodiment, the support subassembly 35 is formed and the covering subassembly 32 is positioned thereon while the form is in place. Once the support subassembly 35 and the covering subassembly 32 are formed, the form is removed.

In use, the fiber tubes are positioned on the form, and the filler elements are positioned in the gaps between fiber tubes, to form the support subassembly 35. The covering subassembly 32 is positioned on the support subassembly 35, to form each segment individually. The segments 22 are attached together to form the blade 20. The blade 20, at its end 24A (FIG. 12), is attached to the rotor (not shown) in a turbine assembly by any suitable fastening means.

In one embodiment, the blade 20 preferably includes a number of segments 22 which are attached end-to-end to each other respectively. For example, as shown in FIG. 12, three segments (identified for clarity as 22A, 22B, and 22C respectively) are attachable to each other end-to-end. (The internal element has been omitted from FIGS. 12 and 13 for clarity of illustration.) As can be seen in FIGS. 12 and 13, the segments are designed to fit together in the predetermined arrangement, i.e., a first preselected end of one segment is formed to mate with a second preselected end of the next segment. Working outwards from the rotor, the outer end of each segment is formed to mate with the next outward segment, until the outermost segment (i.e., including the outer tip 25) is reached. For instance, as can be seen in FIG. 12, end 24C is formed to fit in end 26B, and end 24B is formed to fit in end 26A.

Preferably, each of the segments 22A-22C is pushed together (FIG. 12), to form the blade 20 (FIG. 13). When the segments are pushed together, mating elements are received in corresponding apertures or bores therefor, as will be described. For example, the segment 22C may be pushed in the direction indicated by arrow 90 in FIG. 12 so that the inner end 24C engages the outer end 26B, and the mating elements at the end 24C engage the apertures at the end 26B. Similarly, the segment 22A may be pushed as indicated by arrow 92 so that the end 26A engages the end 24B. It will be appreciated by those skilled in the art that the segment may be assembled in various ways. Once the segments are attached together, as shown in FIG. 13, seams formed in the surface 21 at the joints between the segments may be filled or covered in any suitable manner, using any suitable material. For instance, a suitable adhesive tape may be used to cover a seam in the surface.

Figure 16B:
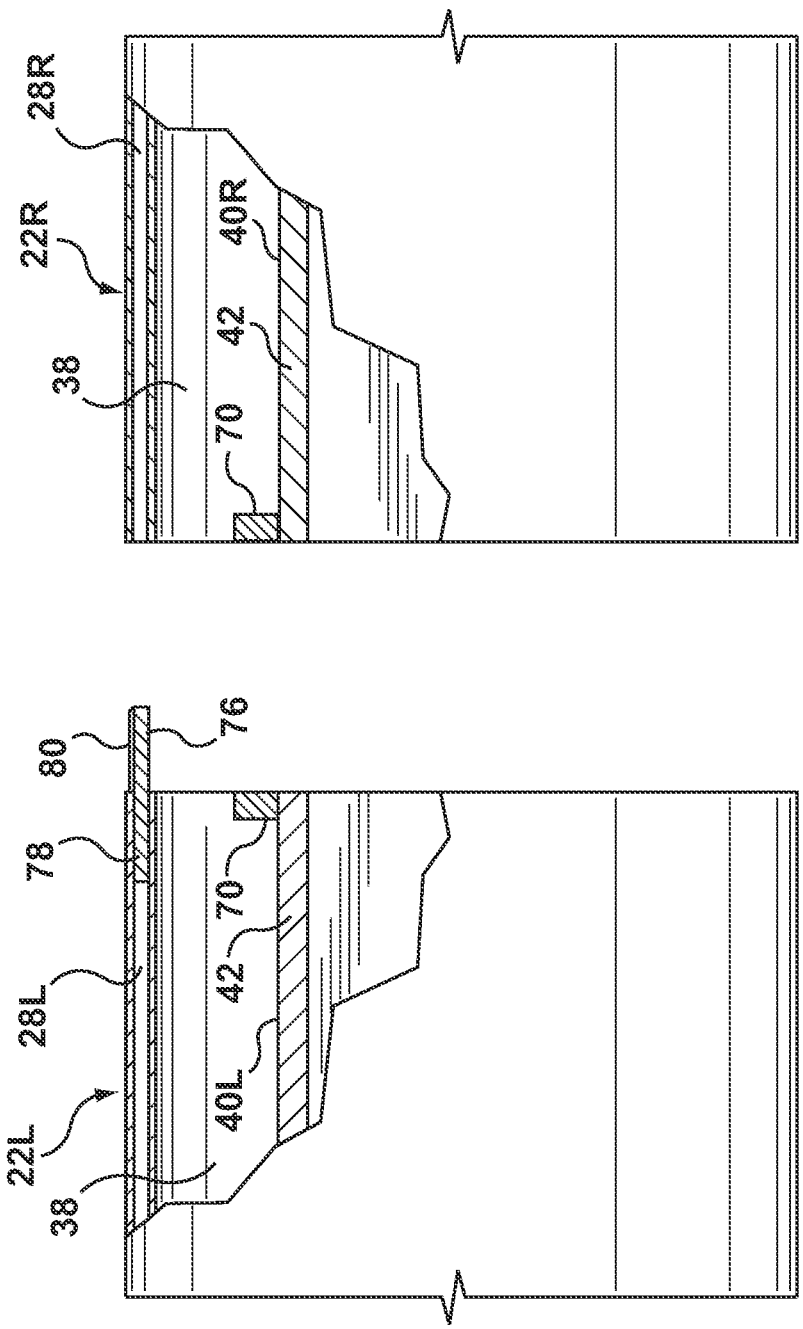
FIG. 16B is a side view of the segments of FIG. 16A, with parts thereof cut away.
Figure 17:
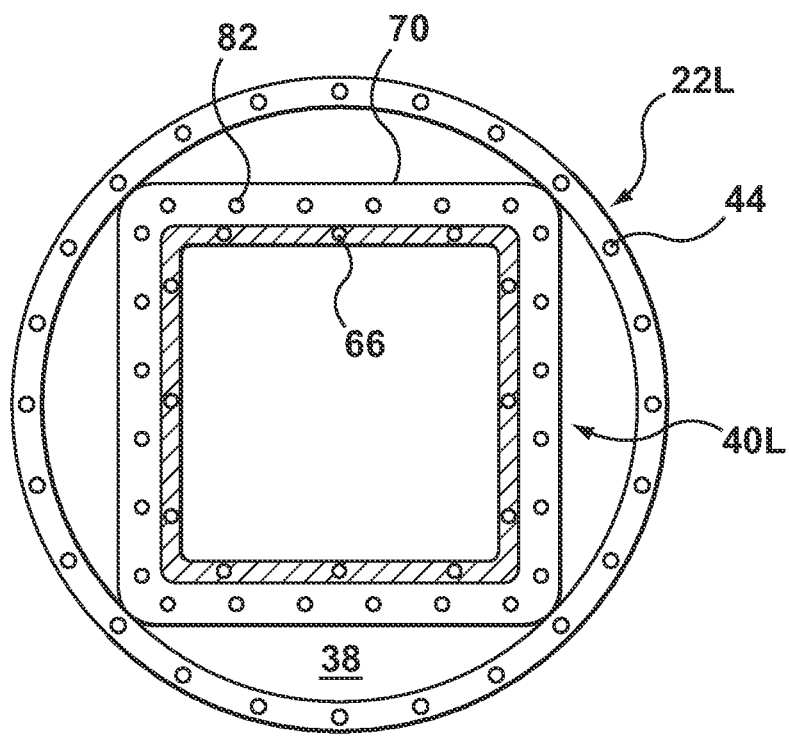
FIG. 17 is an end view of one of the segments of FIG. 16A.

The support subassembly 35 and the covering subassembly 32 preferably at least partially define an internal cavity 38 in each segment 22 (FIGS. 16B, 17). Preferably, each segment 22 also includes one or more internal frames 40 positioned in the internal cavity 38, for at least partially supporting the covering subassembly 32, and the support subassembly 35. The internal frame 40 preferably includes a number of frame fiber tubes 42 therein. The frame fiber tubes 42 extend substantially between the inner and outer ends of each segment 22. Preferably, selected ones of the segments 22 cooperate with selected cooperating ones of the segments 22 respectively, to attach the segments 22 together end-to-end in the predetermined arrangement.

In one embodiment, selected ones of the segments 22 additionally include one or more mating elements mounted in each selected one 22. Each mating element 44 extends beyond a first preselected end 60 of each said selected one 22. Each cooperating one of the segments 22 includes a number of apertures 62 in a second preselected end 64 thereof. The mating elements 44 are receivable in the apertures 62 respectively when the first preselected end 60 and the second preselected end 64 are engaged, for attaching the selected one and the cooperating one of the segments 22 together in the predetermined arrangement.

For instance, the selected one 22L of the segments 22 and the cooperating one 22R of the segments 22 are shown in FIGS. 16A and 16B. The mating elements 44 preferably are positioned in fiber tubes 28L (FIG. 16B) in the segment 22L, so that exposed portions 76 of the mating elements 44 extend beyond the first preselected end 60 of the segment 22L. Preferably, each mating element 44 is formed to be received in the fiber tubes 28L (FIG. 16B), and non-exposed portions 78 (FIG. 16B) are held in the fiber tubes 28L. In one embodiment, the non-exposed portions 78 are held in the fiber tubes 28L by adhesive (not shown). (It will be understood that only one fiber tube 28R and one fiber tube 28L are shown in FIG. 16B to simplify the illustration.)

Preferably, the segment 22L is moved toward the segment 22R (i.e., in the direction indicated by arrow "A" in FIG. 16A) until the exposed portions 76 are fully inserted into the fiber tubes 28R and the first and second ends 60, 64 are engaged. (It will be understood that only the portions of the fiber tubes 28R in which the exposed portions 76 are engaged are shown in FIG. 16A, for clarity of illustration.) Alternatively, the segment 22R is moved toward the segment 22L (i.e., in the direction indicated by arrow "B" in FIG. 16A), or both segments 22L and 22R are moved toward each other, until the first and second ends 60, 64 are engaged.

Preferably, before each exposed portion 76 is inserted into the fiber tube 28R, the exposed portion 76 is covered with a suitable adhesive 80 (FIG. 16B). The glue, once cured, at least partially holds the exposed portion 76 in the fiber tube 28R.

It will be appreciated by those skilled in the art that the mating elements 44 may, alternatively, be partly positioned in one of the segments 22L, 22R, and partly position in the other.

In one embodiment, each selected one includes a number of frame mating elements 66 mounted in the internal frame 40 of each selected one. Each frame mating element 66 extends beyond the first preselected end 60 of each selected one 22. Each cooperating one of the segments 22 includes a number of frame apertures 68 in the second preselected end 64 in which the frame mating elements 66 are receivable in the first preselected end 60 and the second preselected end 64 are engaged, for attaching the selected one and the cooperating one of the segments 22 together in the predetermined arrangement.

In one embodiment, the frame mating elements 66 protrude from the first preselected end 60, and are receivable in the frame apertures 68 in the segment 28R. The frame mating elements 66 are mounted in the internal frame 40L (FIGS. 16B, 17). The frame apertures are in the internal frame 40R (FIGS. 16B, 17). Preferably, adhesive is placed on the frame mating elements 66 before they are inserted into the frame apertures, to cause the frame mating elements 66 to be held in the frame apertures 68 once the adhesive has cured.

Preferably, each internal frame 40 includes a flange 70 adapted for receiving a fastener 72 therein. Each internal frame 40 in each cooperating one of the segments includes a cooperating flange adapted for receiving the fastener 72 therein. When the first preselected end 60 and the second preselected end 64 are engaged, the flange 70 and the cooperating flange are securable together by the fastener 72, for attaching the selected one and the cooperating one of the segments 22 together in the predetermined arrangement.

In FIGS. 18A-18C, the segments 22Q and 22P are shown. In segment 22P, the internal frame 40P includes the cooperating flange 70P, which includes threaded holes 82 in which bolts 72Q are threadably receivable. The bolts 72Q are rotatably mounted in flange 70Q in internal frame 40Q. After the ends 62P, 64Q are engaged, the bolts 72Q are threadably engaged in the holes 82P, and subsequently tightened, to tightly engage ends 62P, 64Q with each other. In practice, the bolt is engaged by a socket (not shown) to which an extension has been attached, in a manner which would be known to those skilled in the art.

It will be understood that the mating elements 44P have adhesive 80 positioned thereon before the mating elements are positioned in the corresponding apertures (not shown) in the end 64Q. Accordingly, those in the art will appreciate that the segments are securely attached together once the mating elements are secured in the apertures by the cured adhesive, and the fasteners 72 have been tightened.

From the foregoing, it can be seen that the segments of the invention can be sized for transportation and assembly at the site, resulting in lower transportation and assembly costs.

Additional embodiments of the invention are shown in FIGS. 4-8, 14, and 15.

Figure 6:
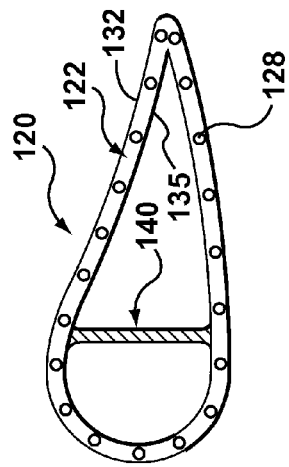
FIG. 6 is a cross-section of the another embodiment of the turbine blade assembly of the invention.
Figure 7:
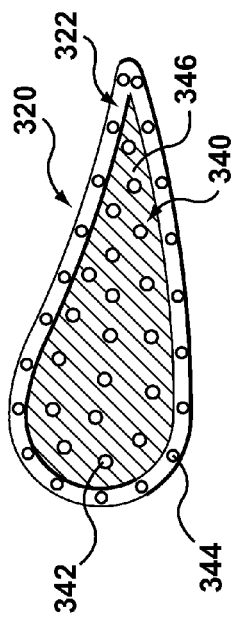
FIG. 7 is a cross-section of the another embodiment of the turbine blade assembly of the invention.

In another embodiment, a wind turbine blade 120 of the invention includes an internal frame 140, for at least partially supporting the segment 122. As can be seen in FIGS. 4 and 6, the internal frame 140 preferably is designed to strengthen the blade 120 overall, with the frame having minimal weight.

It will be understood that, in constructing each segment 122, the internal frame 140 preferably is constructed first, and the support subassembly 135 including fiber tubes 128 is positioned on the internal frame 140. The covering subassembly 132 is positioned on the support subassembly. The internal frame 140 remains in place in order to strengthen the blade 120 overall. The internal frame may include a number of discrete elements positioned along the length of the blade, as will be described.

In another embodiment, the internal frame 240 in a blade 220 preferably includes a plurality of frame fiber tubes 242 positioned therein. Preferably, the frame fiber tubes 242 are substantially aligned with the fiber tubes 228 in the segment 222.

In this embodiment, the internal frame 240 is constructed, and the support subassembly 235 is positioned on the internal frame 240. The covering subassembly 232 is positioned on the support subassembly 235.

Figure 9:
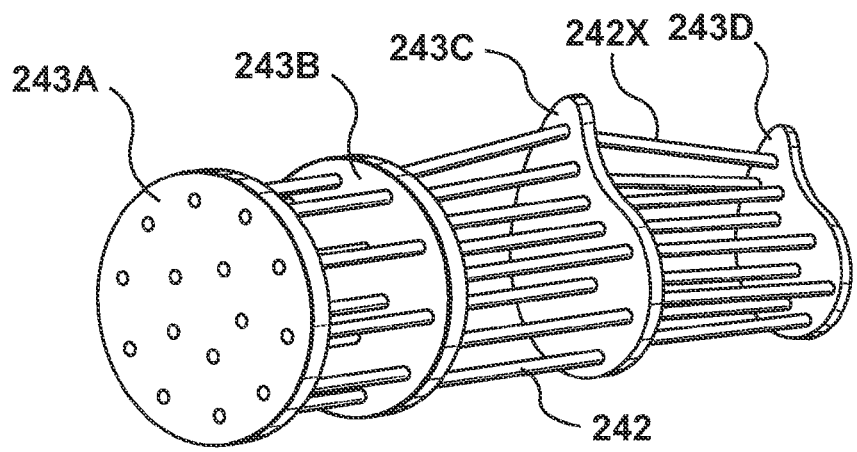
FIG. 9 is an isometric view of an embodiment of an internal frame of the invention to be positioned inside the body, drawn at a larger scale.

As can be seen in FIG. 9, the internal frame 240 preferably includes a plurality of frame elements 243. (The internal frame shown in FIG. 9 is that illustrated in FIG. 7.) For example, frame elements 243A, 243B, 243C, and 243D are identified in FIG. 9 for purposes of illustration. The frame fiber tubes 242 are positioned in the elements, and individual frame fiber tubes may extend through several elements 243. In one embodiment, frame fiber tubes of different lengths are used, to fit in the segment in which the internal frame is to be positioned. By way of example, a frame fiber tube identified as 242X extends only from element 243A to element 243D, due to its position near the outer edges of the elements.

The frame fiber tubes 242 preferably are made of any suitable fibers, in any suitable manner. For example, in one embodiment, the frame fiber tubes are formed by wrapping carbon fiber cloth around a substantially cylindrical core element. However, it will be understood that the frame fiber tubes 242 may be made of other suitable material or materials, e.g., Kevlar fibers, or fibreglass. In order to minimize production costs, it is preferred that the fiber tubes 228 and the frame fiber tubes 242 are substantially the same in diameter and thickness.

Figure 10:
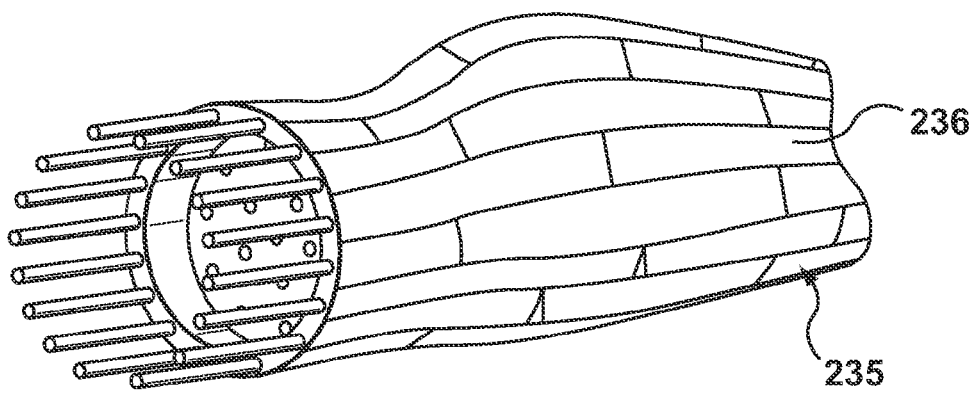
FIG. 10 is an isometric view of the internal frame of FIG. 9 with a support subassembly positioned on the internal frame.

The support subassembly 235 is positioned on the internal frame 240. It will be understood that the elements 243 are locked into place by any suitable means, to secure the frame elements 243 to the support subassembly 235. The support subassembly 235 preferably includes slat elements 236 which are held in position on the fiber tubes 228 by any suitable means (FIG. 10). Subsequently, the covering subassembly 232 is positioned on the support subassembly 235. As shown in FIG. 11, the covering subassembly may be applied in layers 237A, 237B, 237C. Multiple layers are shown in FIG. 11 for illustrative purposes only, and it will be understood that the segment 220 is complete when all layers have been applied, from one end 224 to the other end 226.

Figure 8:
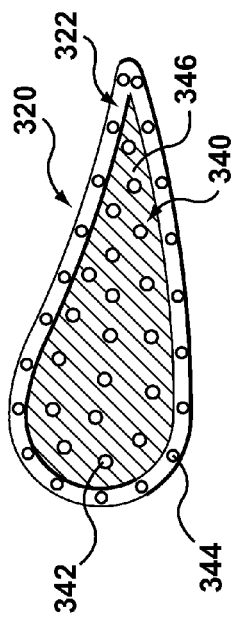
FIG. 8 is a cross-section of the another embodiment of the turbine blade assembly of the invention.

In another embodiment, a wind turbine blade 320 includes an internal frame 340 which includes a number of frame fiber tubes 342 substantially fills the internal cavity of the segment 322 (FIG. 8). Preferably, the frame fiber tubes 342 are positioned in a predetermined pattern relative to each other by one or more frame elements 346 for supporting the second carbon fibers 344.

In another embodiment, the wind turbine blade is formed by first, providing one or more internal frames and second, locating fiber tubes spaced apart from each other in a predetermined pattern in a support subassembly which is at least partially supported by the internal frame. Finally, one or more covering subassemblies are positioned on the support subassembly.

Another embodiment of the support subassembly 435 of the invention is shown in FIGS. 14 and 15. The fiber tubes 428 are spaced apart from each other and the filler element 434 is positioned between the covering subassembly 432 (FIG. 15) and the underlying layer 431. (The covering subassembly 432 is not shown in FIG. 14 for purposes of illustration.) As can be seen in FIGS. 14 and 15, the fiber tubes 428 preferably are supported by the filler element 434 and also separated by the filler element 434. Specifically, shorter portions 454 of the filler element 434 are respectively positioned between the underlying layer 431 and the fiber tubes 428. Also, longer portions 456 of the filler element 434 extend between the covering subassembly 432 and the underlying layer 431 and are positioned between the fiber tubes 428. As shown in FIGS. 14 and 15, the fiber tubes 428 are substantially defined by respective axes 450 thereof.

In one embodiment, the filler element 434 preferably includes a body in the form of a matrix in which a plurality of elongate apertures 451 positioned substantially orthogonally to the axes 450 of the fiber tubes 428. It is preferred that the apertures 451 are substantially defined by respective axes 452 thereof.

The filler element 434 preferably is made of sheets 458 of a suitable material to form a substantially laminar structure. The sheets 458 preferably are attached together in any suitable manner. For instance, the sheets 458 may be made of Kevlar, and they may be glued together.

The filler element 434 has substantial strength and stiffness in the direction parallel to the axes 452, but is also relatively flexible in the direction orthogonal thereto, i.e., in the direction parallel to the axes 450 of the fiber tubes. The geometry of the filler element is inherently very strong, in the direction parallel to the axes 452. These characteristics are desirable because of the forces to which the turbine blade is subjected. In addition, with the filler element 434, a more complex shape of the segment is relatively more easily formed.

It will be appreciated by those skilled in the art that the invention can take many forms, and that such forms are within the scope of the invention as described above. The foregoing descriptions are exemplary, their scope should not be limited to the preferred versions provided therein.

We claim:

1. An elongate segment of a wind turbine blade, the elongate segment comprising:
    a plurality of fiber tubes extending along preselected lengths of the segment respectively;
    said fiber tubes being laterally spaced apart from each other respectively to define gaps therebetween;
    a covering subassembly at least partially supported by the fiber tubes and at least partially defining an internal cavity;
    at least one internal frame positioned in the internal cavity, for at least partially supporting the covering subassembly; and
    said at least one internal frame comprising a plurality of frame fiber tubes therein, said frame fiber tubes substantially extending between inner and outer ends of the segment.

2. A wind turbine blade comprising a plurality of segments, each said segment comprising:
    a plurality of fiber tubes extending along preselected lengths of the segment respectively;
    said fiber tubes being laterally spaced apart from each other respectively to define gaps therebetween;
    a covering subassembly at least partially supported by the fiber tubes and at least partially defining an internal cavity;
    the segments being attached together end-to-end in a predetermined arrangement such that the respective covering assemblies of said segments cooperate to form a substantially smooth surface of the wind turbine blade;
    each said segment additionally comprising at least one internal frame positioned in the internal cavity, for at least partially supporting the covering subassembly; and
    each said internal frame comprising a plurality of frame fiber tubes therein, said frame fiber tubes substantially extending between inner and outer ends of each said segment.

3. A wind turbine blade according to claim 2 in which selected ones of said segments cooperate with selected cooperating ones of said segments respectively to attach said segments together end-to-end in the predetermined arrangement.

4. A wind turbine blade according to claim 3 in which:
    each said selected one of said segments additionally comprises a plurality of mating elements mounted in each said selected one, each said mating element extending beyond a first preselected end of each said selected one; and
    each said selected cooperating one of said segments comprises a plurality of apertures in a second preselected end thereof in which said mating elements are receivable when the first preselected end of each said selected one and the second preselected end of said selected cooperating one of said segments are engaged, for attaching said selected one and said cooperating one of said segments together in the predetermined arrangement.

5. A wind turbine blade according to claim 4 in which:
    each said selected one additionally comprises a plurality of frame mating elements mounted in said internal frame of each said selected one, each said frame mating element extending beyond the first preselected end of each said selected one; and
    each said cooperating one of said segments comprises a plurality of frame apertures in the internal frame thereof in which said frame mating elements are receivable when the first preselected end of said selected one and the second preselected end of said cooperating one of said segments are engaged, for attaching said selected one and said cooperating one of said segments together in the predetermined arrangement.

6. A wind turbine blade according to claim 5 in which:
    each said internal frame in each said selected one of the segments comprises a flange adapted for receiving a fastener therein;
    each said internal frame in each said cooperating one of said segments comprises a cooperating flange adapted for receiving the fastener therein; and
    when the first preselected end of said selected one and the second preselected end of said cooperating one of said segments are engaged, the flange and the cooperating flange are securable together by the fastener, for attaching said selected one and said cooperating one of said segments together in the predetermined arrangement.

7. A method of making a segment of a wind turbine blade comprising:
    (a) providing at least one internal frame comprising a plurality of frame fiber tubes substantially extending between inner and outer ends of the segment;
    (b) providing a plurality of fiber tubes;
    (c) positioning said fiber tubes spaced apart from each other in a predetermined pattern such that the fiber tubes are at least partially supported by said at least one internal frame to form a support subassembly, the fiber tubes extending along preselected lengths of the segment respectively;
    (d) providing at least one covering subassembly; and
    (e) positioning said at least one covering subassembly on the support subassembly.

\* \* \* \* \*